United States Patent [19]

Strange

[11] 4,013,158
[45] Mar. 22, 1977

[54] ELECTROGRAPHIC SEGMENT ELECTRODE CLAMPING ASSEMBLY

[75] Inventor: Robert F. Strange, Round Rock, Tex.

[73] Assignee: Bausch & Lomb Incorporated, Rochester, N.Y.

[22] Filed: Apr. 2, 1976

[21] Appl. No.: 673,029

[52] U.S. Cl. .......................... 197/1 R; 346/139 C; 101/93.04; 29/592
[51] Int. Cl.² ...................... B41J 1/28; G01D 15/06
[58] Field of Search ............. 197/1 R; 29/592, 624, 29/630, 631; 346/139 C, 139 A, 74 B; 101/93.04

[56] References Cited

UNITED STATES PATENTS

| | | | |
|---|---|---|---|
| 2,702,428 | 2/1955 | Hendrich et al. | 197/1 R X |
| 3,725,950 | 4/1973 | Lamb | 346/74 ES |
| 3,771,634 | 11/1973 | Lamb | 197/1 R |
| 3,837,074 | 9/1974 | Griff | 29/624 |
| 3,871,939 | 3/1975 | Woods | 29/630 R X |
| 3,955,204 | 5/1976 | Anton | 197/1 R X |
| 3,971,311 | 7/1976 | Deproux | 197/1 R X |

FOREIGN PATENTS OR APPLICATIONS

| | | | |
|---|---|---|---|
| 2,338,126 | 7/1973 | Germany | 197/1 R |
| 2,348,556 | 9/1973 | Germany | 197/1 R |
| 2,353,182 | 5/1975 | Germany | 197/1 R |

Primary Examiner—E. H. Eickholt
Attorney, Agent, or Firm—Frank C. Parker; Bernard D. Bogdon

[57] ABSTRACT

A clamping assembly for an array of segment electrodes for use in electrographic printers and the like, includes a compressible and electrically non-conductive material disposed between the segment electrodes and a clamping member. The individual segment electrodes are accurately disposed relative to each other and to the printer when a clamping force exerted on the clamping member squeezes the compressible material to extrude it into openings between each individual segment electrode to thereby electrically insulate each from the other and to preset their positional relationship.

12 Claims, 4 Drawing Figures

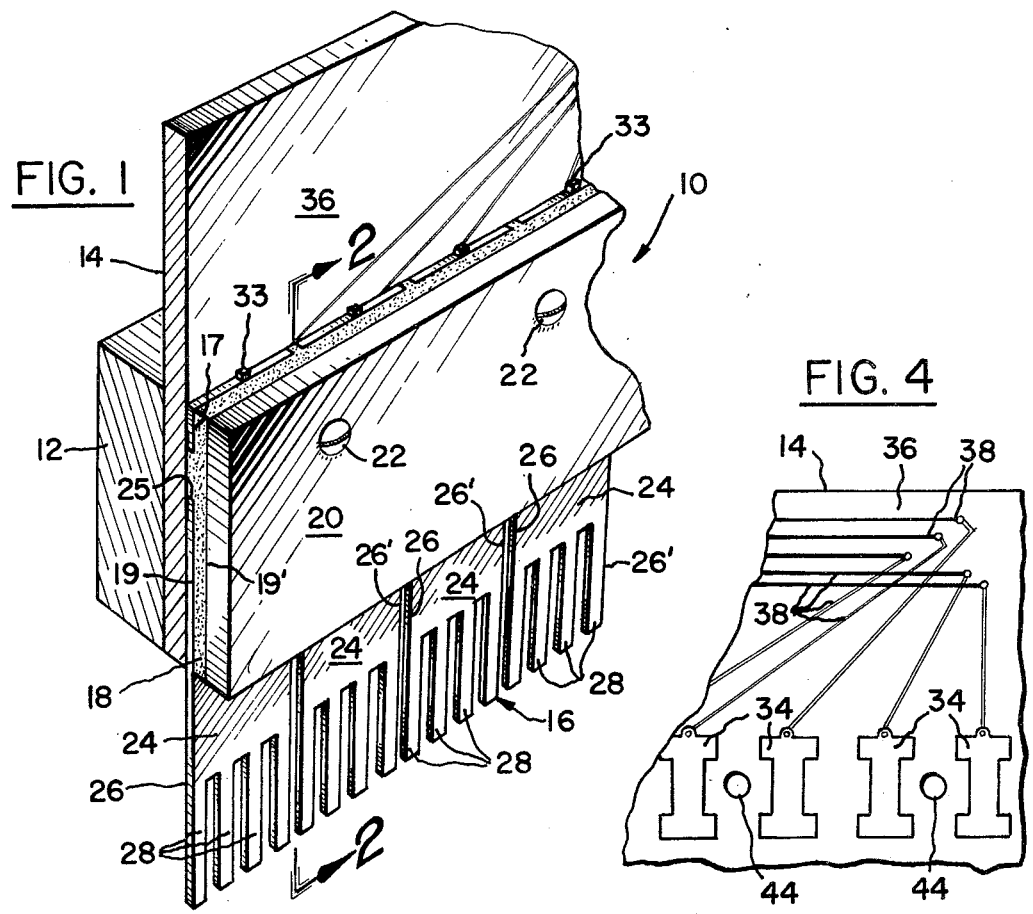
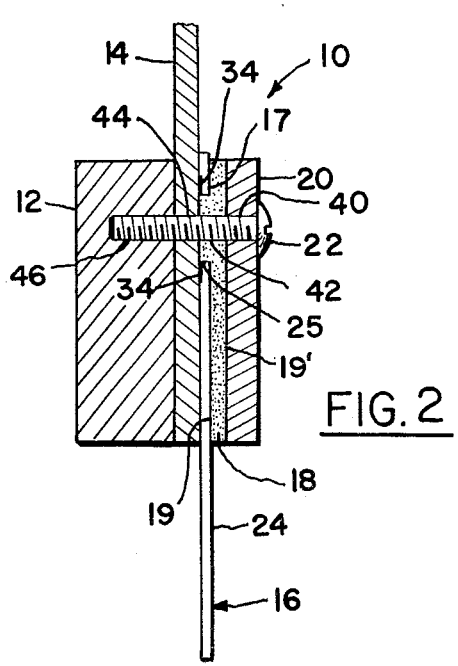
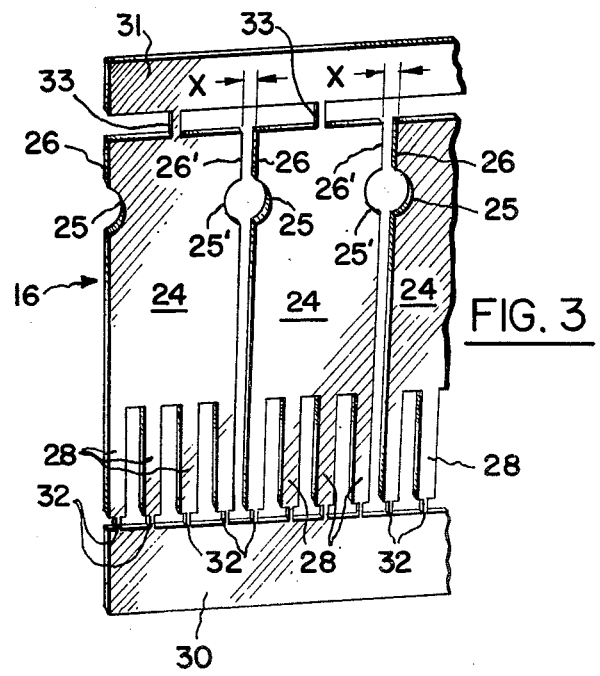

ELECTROGRAPHIC SEGMENT ELECTRODE CLAMPING ASSEMBLY

BACKGROUND OF THE INVENTION

1. Field of the Invention

This invention relates to a clamping assembly for an array of segment electrodes and, more particularly, to a clamping assembly in which a compressible material is used as an electrical insulator and as a means of maintaining the necessary alignment relationship between individual portions of the segment electrode array and the electrographic printer.

2. Description of the Prior Art

The methods used in the past to secure an array of segment electrodes to an electrically energized driver board and then to the proper recording instrument generally were time consuming and involved a number of special tools, fixtures or processes. Frequently, a liquid bonding agent was applied to the combined segment electrode display and support fixture. Thereafter, the unit was placed into an oven where the liquid bonding agent would be cured, resulting in the segment array and the support fixture being permanently bonded together. Each individual segment of the segment array, however, had to be kept from moving until the bonding agent cured, since, as is appreciated, it is necessary to maintain close dimensional relationships between adjacent segment electrodes. A more positive method of maintaining alignment, that is less costly and time consuming became necessary. It is to that end that this invention is directed.

BRIEF SUMMARY OF THE INVENTION

The segment electrode clamping assembly, as set forth by this invention, provides a manner of producing a completed segment electrode array board which is easily held to set close tolerances under ordinary manufacturing conditions and by implementing standard techniques. Further, the segment electrode clamping assembly requires no materials which have to be subjected to heat or other curing procedures. The clamping assembly further provides for a segment electrode array board which, once completed, maintains preset close tolerances. An electrically non-conductive compressible material which may have an adhesive substance on opposite sides, is placed in contact with a segment electrode array. Suitable clamping means are thereafter applied to the present electrically energized driver board, to form a segment electrode assembly. The clamping means forces the compressible material to fill the spaces between each individual segment of the array thereby fixing the positional relationship of each individual segment of the array to each remaining segment and to the recording instrument.

The segment electrode of the present assembly of the present invention may be used, for instance, in a printer, such as the kind disclosed in U.S. Pats. Nos. 3,725,950 and 3,771,634 and in the cover assembly of concurrently filed copending patent application Ser. No. 673034 entitled "ELECTROGRAPHIC RECORDER COVER ASSEMBLY WITH RETRACTABLE ELECTRODES".

BRIEF DESCRIPTION OF THE DRAWINGS

FIG. 1 is an enlarged partial perspective sectional view showing the segment electrode clamping assembly according to the principles of this invention;

FIG. 2 is another sectional view taken along line 2-2 of FIG. 1;

FIG. 3 is a partial perspective view of a segment electrode array for use in the embodiment illustrated in FIG. 1; and FIG. 4 is a partial view of the printed circuit driver board.

DETAILED DESCRIPTION OF THE PREFERRED EMBODIMENT

In referring to the drawing there is shown a segment electrode clamping assembly 10 which comprises, generally, a base frame 12, a printed circuit driver board 14, a segment electrode array 16, a compressible insulating and clamping material 18, a rigid member or bar 20 and appropriate means, such as the illustrated plurality of screws 22, of exerting a compressive force between the bar 20 and the base frame 12.

FIGS. 1 and 2 of the drawing best illustrate the clamping arrangement of the preferred assembly. The base frame 12 is formed from a material which is, preferably, rigid and, depending upon the designer's choice, the frame 12 may be of electrically conductive or non-conductive material. An electrical driver board 14 would be positioned on the base frame 12. A segment electrode array 16 is disposed on the electrical driver board 14 in such a way, to be explained more fully hereinafter, that a good electrical connection is made between the two.

FIG. 3 shows a portion of a typical segment electrode array 16 which is comprises of a series of individual segments 24. Relieved areas 25 and 25' are formed toward one end of each individual electrode 24 and in opposing sides 26 and 26' thereof, respectively. Each relieved area 25 on each individual segment 24 is opposite another relieved area 25' on an adjacent segment 24. Formed on the opposite end of each respective segment 24 is a series of protruding finger-like extensions 28 which, in turn, are joined to a rigid bar 30 by a series of thin connecting tabs 32. At the opposite end of the segment electrode array there is a second bar 31 which is joined to the array 16 by a further series of like tabs 33. The bars 30 and 31 are formed to maintain the center segment electrodes in a rigid relationship to each other during handling and assembly and are later detached from the segment electrode array 16. The detachment of the bars 30 and 31 will be more fully explained hereinafter.

It has been found that the segment electrode array may be produced from beryllium copper by the process of photo etching. Of course, to be most effective the copper should ideally be fairly thin in cross-section. The printed circuit driver board, as best shown in FIG. 4, has a series of, for example, I-shaped electrically conductive pads 34 formed on a surface 36 which will face the segment electrode array 16. The I-shaped pads 34 are formed by appropriate printed circuitry techniques, and are mechanically a part of electrically conductive paths generally indicated by numeral 38, which are joined to an electrical terminal block formed thereon, but not illustrated.

Once the segment electrode array 16 has been positioned on the driver board 14 so that the center of the I-shaped pads 36 line up with the area of the segment fingers 24 defined between the relieved areas 25-25', the preferably thin, yet compressible, material 18 is aligned and can be affixed to each individual segment 24 of the segment electrode array 16. It has been found that a two-sided adhesive tape, such as Scotch-Mount No. 4032 produced by Minnesota Minning & Manufacturing Co. of St. Paul, Minn., works satisfactorily in this application. Any selected tape, ideally, should be pressure sensitive, have a long shelf life, be resistant to attack by solvents and have a urethane foam center. Each respective side 19 and 19' of the compressible material 18 can have an adhesive surface thereon. As is evident, the adhesive surface 19 of the compressible material 18, when affixed to surface 17 of the segment electrode array 16, will hold the array 16 in the alignment defined by the rigid bars 30 and 31 of the array of FIG. 3. The adhesive surface 19 will also insure that the original spacing, as indicated by "X" in FIG. 3, will be kept between the individual segments 24 of the array 16 after detachment of the rigid bars 30 and 31.

A rigid clamping member 20, which may be manufactured from substrate material of flame retardant laminated plastic, is positioned on the other adhesive surface 19' of the compressible material 18. A plurality of, for instance, drive or self-threading screws 22, rivets, staking material or similar devices, are then used to clamp the assembly 10 together. The plurality of screws 22 pass through a series of apertures 40, 42 and 44, as best seen in FIG. 2, which are formed in the rigid member 20, the compressible material 18 with surfaces 19 and 19' and the driver board 14, respectively. A plurality of holes 46 are provided in the base frame 12 for receiving the screws 22. As will be appreciated, the series of apertures 40, 42, 44 & 46 are coaxial, or substantially so, for the component parts to be assembled to one another. Further, they are also substantially aligned with the relieved areas 25 and 25' of the individual segment electrodes 24 so that the screws 22 may pass therethrough without making contact with the area defined between relieved areas 25-25'.

In consideration of the assembling process refer again to FIG. 3. It will be seen that the rigid bars 30 and 31 maintain the relieved areas 25 and 25' of the segment electrodes 24 in correct positional relationship relative to each other and, further, control the distance "X" between each individual segment. Through use of the rigid bars 30 and 31, the entire segment electrode array 16 may be positioned in the assembly at one time without any undue effort caused by the necessity of aligning each individual segment 24 of the array 16.

As the plurality of screws 22 are tightened to exert a compressive force on the assembly 10, the compressible material 18 is squeezed to such an extent that it extrudes into the openings that exist along its contact surfaces. The space "X" between each individual segment of the array 16, and the relieved areas 25 and 25' formed therein, become substantially filled with the compressible insulating material 18 in such a manner that the plurality of screws 22 are further electrically insulated from the individual segments 24. Further, by filling the space "X", movement between the individual segments 24 is precluded once the clamping procedure is complete. At such time the individual segment electrodes 24 are part of the assembly and in the same relative relationship to each other as originally designed and manufactured and are therefore correctly positioned with respect to each other and can be registered to the printing instrument in which they will be used.

Considering other ways of assembling the final unit, it may be desirable to assemble the segment electrode array 16 to the two-sided adhesive 18 and then attach the rigid holding member 20. The printed circuit driver board 14 and base frame 12 are subsequently mounted. Other alternative assembly procedures and variations of the suggested procedures obviously exist.

Once all of the preceding steps have been followed and the segment electrode assembly 10 is complete, the rigid bars 30 and 31 may be separated from the segment electrodes 24 by breaking them off, in any convenient manner, at the connecting joints 32 and 33. For example, a scoring instrument may be drawn along the top of rigid holding member 20 to sever the connecting joints 33, thereby separating the locating bar 31 from the segment electrodes 24. Rigid bar 30 may be separated from the segment electrode fingers 28 by gently bending the connecting joints 32 back and forth until they break. Obviously, other suitable devices may be used, such as fixtures or clamps, to separate the locating bars 30 and 31 from the segment electrodes. Any procedures which separates them without damaging them is acceptable. The assembly 10, once completed in any of the before mentioned described procedures, may then be mounted to the designated and appropriate electrographic instrument. Generally, the base frame 12 is mounted to the electrographic instrument so that the segment electrode fingers 28 are aligned and can make electrical contact with a complimenting stylus electrode board.

It will be appreciated that an alternative embodiment, for example, may comprise the essential elements of the embodiment hereinbefore described including the base frame 12, printed circuit driver board 14, segment electrode array 16 and a continuous length adhesive material, quite similar to material 18. Once the adhesive material is applied to the segment electrode array 16, the originally defined spacing between the individual segments is maintained. In this embodiment it is necessary only to insure that electrical connection between the segment electrode array 16 and the printed circuit driver board 14 is made in a satisfactory mechanical manner. Although it is desirable to include in this assembly a bar like member to extend the length of the segment electrode array 16, as does the rigid member 20, it is not essential that it be a clamping bar. It need only provide mechanical attachment of that bar, the adhesive material and the segment electrode array 16 to the printed circuit driver board 14 and the base frame 12. FIGS. 1 and 2 essentially shown this alternative arrangement. The only significant difference is that the material need not be compressed into the spacings between each individual segment electrode 24 and the apertures used for the screws 22.

It will be appreciated that although the preferred and alternative embodiments of the invention have been shown and described, other changes and modifications may be made thereto without departing from the spirit or scope of the invention as set forth in the following claims:

It is claimed:
1. An electrographic printer segment electrode clamping assembly for use with electrographic printer stylus electrodes, comprising:
   support means for mounting to the electrographic printer;
   a segment electrode driver board carried by the support means;
   an array of segment electrodes in electrical engagement with the driver board and disposable to engage stylus electrodes in an electrographic printing apparatus;

compressible means disposed on the array of segment electrodes opposite the driver board; and clamping means for exerting a compressive force between the compressible means and the support means to deform the compressible means and thereby secure the alignment of the array of segment electrodes with respect to the support means mountable to the electrographic printer.

2. The segment electrode clamping assembly as defined in claim 1, wherein said compressible means is a compressible material having an adhesive substance affixed to at least one side thereof.

3. The segment electrode clamping assembly as defined in claim 1, wherein said clamping means includes a plurality of screws.

4. The segment electrode clamping assembly as defined in claim 1, wherein said array of segment electrodes defines on opposite sides of each individual segment electrode a relieved area.

5. The segment electrode clamping assembly as defined in claim 4, wherein the clamping means communicates through said relieved area of each individual segment electrode.

6. Segment electrode clamping assembly for use in an electrographic printing apparatus, comprising:

an electrically energized driver board for aligning with and engaging a base frame of the electrographic printing apparatus;

an array of segment electrodes aligned with and engaging said electrical driver board, each individual segment thereof being accurately positioned with respect to each other segment and to said driver board;

a compressible material engaging said array of segment electrodes;

a support member for engaging said compressible material; and clamping means engaging said base frame and said support member for exerting a compressive force therebetween thereby securing said array of segment electrodes with respect to each individual segment electrode thereof and to said driver board.

7. The segment electrode clamping assembly as defined in claim 6, wherein said compressible material has an adhesive substance affixed to at least one side thereof.

8. The segment electrode clamping assembly as defined in claim 7, wherein said array of segment electrodes includes a series of relieved areas formed therein.

9. The segment electrode clamping assembly as defined in claim 8, wherein said clamping means passes through said series of relieved areas formed in said segment array.

10. A method of clamping a segment electrode array assembly for use in the printing head of electrographic printing instrument, comprising the steps of:

arranging said segment electrode array in a predetermined spaced apart relationship;

applying a compressible material to one side of said segment electrode array;

engaging a driver board to the opposite side of said segment electrode array for electrical connection therewith; and applying a compressive force to compress said compressible material thereby securing the predetermined spaced apart relationship of the segment electrode array.

11. An electrographic printer segment electrode assembly for use with electrographic printer stylus electrodes comprising:

support means for mounting to the electrographic printer;

a segment electrode driver board carried by the support means;

an array of segment electrodes in electrical engagement with the segment electrode driver board and disposable to engage stylus electrodes in an electrographic printing apparatus; and adhesive means disposed on the array of segment electrodes opposite the driver board to secure the segment electrodes relative to each other and to the segment electrode driver board and support means.

12. The electrographic printer segment electrode assembly as defined in claim 11, further including means applied to the surface of the adhesive means opposite the array of segment electrodes for securing the adhesive means, the segment electrode array and the driver board to the support means.

* * * * *

UNITED STATES PATENT AND TRADEMARK OFFICE
CERTIFICATE OF CORRECTION

PATENT NO. : 4,013,158
DATED : March 22, 1977
INVENTOR(S) : Robert F. Strange

It is certified that error appears in the above-identified patent and that said Letters Patent are hereby corrected as shown below:

Col. 1, lines 48-50, change "Suitable clamping means are thereafter applied to the present electrically energized driver board, to form a segment electrode assembly." to --Suitable clamping means are thereafter applied to the segment electrode array and compressible material, along with an electrically energized driver board, to form a segment electrode assembly.--.

Col. 1, line 56, after "electrode" insert --assembly--.

Col. 2, line 31, change "comprises" to --comprised--.

Col. 4, line 48, change "shown" to --show--.

Col. 6, line 27, before "comprising" insert a comma.

Signed and Sealed this

Fourth Day of October 1977

[SEAL]

Attest:

RUTH C. MASON
Attesting Officer

LUTRELLE F. PARKER
Acting Commissioner of Patents and Trademarks